United States Patent [19]
Ash et al.

[11] Patent Number: 5,943,413
[45] Date of Patent: Aug. 24, 1999

[54] METHOD FOR SELECTIVELY ROUTING ENHANCED CALLS

[75] Inventors: Gerald Richard Ash, West Long Branch; Jiayu Chen, Middletown; Sanjeev K. Deora, Iselin; Young Lee, Edison, all of N.J.

[73] Assignee: AT&T Corp., Middletown, N.J.

[21] Appl. No.: 08/871,061

[22] Filed: Jun. 9, 1997

[51] Int. Cl.[6] ................................................. H04M 7/00
[52] U.S. Cl. ............................................ 379/220; 379/347
[58] Field of Search ................................... 379/219, 220, 379/221, 347, 406, 410

[56] References Cited

U.S. PATENT DOCUMENTS

| | | | |
|---|---|---|---|
| 5,195,132 | 3/1993 | Bowker et al. | 379/410 |
| 5,333,195 | 7/1994 | Bowker et al. | 379/410 |
| 5,485,515 | 1/1996 | Allen et al. | 379/391 |
| 5,521,919 | 5/1996 | Anderson et al. | 379/347 |
| 5,524,148 | 6/1996 | Allen et al. | 379/391 |
| 5,539,806 | 7/1996 | Allen et al. | 379/347 |
| 5,592,545 | 1/1997 | Ho et al. | 379/347 |
| 5,737,389 | 4/1998 | Allen | 379/347 |
| 5,802,164 | 9/1998 | Clancy et al. | 379/220 |

Primary Examiner—Scott Wolinsky
Attorney, Agent, or Firm—Robert B. Levy

[57] ABSTRACT

A telecommunications network (10) includes an Originating Switching System ($12_1$) and a Terminating Switching System ($12_2$) linked by a plurality of trunks ($20_1$–$20_4$). For each incoming call it receives, the Originating Switching System establishes a Circuit Selection Capability Indicator (CSCI) value that determines what enhancement, if any, the Originating Switching System will provide to the call. The Originating Switching System also utilizes the CSCI value to select an appropriate trunk that is compatible with a type of call enhancement, if any, to route the call to the Terminating Switching System which also enhances the call in accordance with the CSCI value. Determining the call enhancement in accordance with the CSCI value allows different types of calls which are routed on the same trunk to get different call quality enhancements, depending on the call type.

30 Claims, 2 Drawing Sheets

METHOD FOR SELECTIVELY ROUTING ENHANCED CALLS

TECHNICAL FIELD

This invention relates to a technique for providing different types of enhancements to telephone calls on a call-by-call basis.

BACKGROUND ART

To meet its customer needs and to differentiate its products and services, AT&T enhances the quality of selected voice calls carried through its inter-exchange network. One such enhancement currently available is AT&T True Voice®service, whereby selected frequencies of a voice call are amplified to provide a more pleasing telephone conversation. The manner in which such frequencies are amplified is described and claimed in U.S. Pat. Nos. 5,195,132 and 5,333,195, both entitled "Telephone Network Speech Signal Enhancement", filed in the name of Duane Bowker et al. and both assigned to AT&T (herein incorporated by reference). Another enhancement available from AT&T is compensation for background noise described in U.S. Pat. Nos. 5,524,148, and 5,485,515, both entitled "Background Noise Compensation in a Telephone Network", filed in the name of Jonathan B. Allen et al. and both assigned to AT&T (herein incorporated by reference). Yet another enhancement provided by AT&T is echo cancellation obtained by routing calls through an echo canceled of a type known in the art.

While the above-described enhancements are useful, they can interact with existing technology, and in some instances, actually impede transmission quality. Presently, calls that require that the enhancement and/or echo cancellation be turned off are routed over separate "overlay" networks. Presently, telecommunications carriers, such as AT&T, use dedicated "overlay" networks to provide specific transmission signal processing, wherein dedicated trunking and tandem switching is implemented to provide specific transmission capabilities. Normally, voice calls are provided echo cancellation and the True Voice® enhancement, wherein the associated transmission signal processing is provided on trunks denoted as TV on trunks. However, for calls not requiring the TV on signal processing, dedicated overlay networks need to be used. For example, Switched Digital Service (SDS) data-type calls are routed through switching systems within the AT&T's network that turn off the enhancement and echo cancellation. Similarly, those voice and voice band calls requiring echo cancellation but also requiring that the voice enhancement be turned off are typically routed to dedicated via switching systems that provide echo cancellation but have the voice enhancements turned off for both incoming and outgoing trunks. While providing a specialized network to carry calls without enhancement and/or echo cancellation overcomes the problem of undesirable interactions, this approach affords little flexibility in terms of enhancing and/or performing echo cancellation on selected calls within a common network and leads to network capacity inefficiencies because of the need to provide separate dedicated networks for different types of calls, rather than using a single integrated network with a signal processing system (SPS) capability to provide the required transmission processing on a per-call-control (PCC) basis.

Thus, there is a need for a technique for routing calls to enable enhancement and/or echo cancellation of calls on a selected basis.

BRIEF SUMMARY OF THE INVENTION

Briefly, in accordance with the invention, a method is provided for routing at least one call in a telecommunications network from an Originating Switching System (OSS), at which the call originates in the network to a Terminating Switching System (TSS), at which the call terminates such that the call is selectively enhanced. As illustrated in FIG. 1b, the dedicated overlay networks can be replaced by an integrated network capability, which consists of trunks that are provided a signal processing system (SPS) capability at the originating switching system (OSS), via switching system (VSS), and terminating switching system (TSS), to provide the desired transmission signal processing on a per-call-control (PCC) basis. These trunks are denoted as SPS per-call-control (SPCC) trunks. SPCC trunks can be used to provide, on a per-call-control basis, the required transmission signal processing, such as (a) echo cancellation with the True Voice® enhancement turned on, denoted as TV on, which could be used for normal voice calls, (b) echo cancellation with the True Voice® enhancement turned off, denoted as TV off, which could be used for example for some voiceband data calls, or (c) no echo cancellation, denoted as EC off, which could be used for example for switched digital services (SDS) calls.

The method of the invention is commenced by receiving an incoming call at the OSS. For each incoming call, the OSS establishes a Circuit Selection Capability Indicator (CSCI) that specifies the type of enhancement, if any, to be provided for the call. For example, the call may be enhanced by performing echo cancellation. In place of such echo cancellation (or in addition thereto), the call may be enhanced by amplifying certain frequencies. Additionally, the call may be enhanced by compensating for background noise. Using the CSCI, the OSS selects one of a plurality of trunks interconnecting the OSS and TSS for routing the call to the TSS which could be either a direct trunk to the TSS, or on a via path through a VSS to the TSS. Based on the CSCI, the OSS performs the selected enhancement, if required. Thus, for example if the CSCI established by the OSS specifies no echo cancellation and no selective frequency enhancement, then the selected trunk can be an SPCC trunk, which can be used to provide, on a per-call-control basis, the required transmission signal processing, which in this case is no echo cancellation, denoted as EC off. Conversely, if the CSCI established by the OSS specifies call enhancement, then a trunk having the capacity to carry such enhanced calls can be an SPCC trunk, which can be used to provide, on a per-call-control basis, the required transmission signal processing, which in this case is echo cancellation with the True Voice® enhancement turned on, denoted as TV on. If such an SPCC trunk is not available, the call can be routed as a second choice option on the TV on trunks illustrated in FIG. 1b, which are provisioned with echo cancellation and with the True Voice® enhancement turned on. Once the trunk is selected, the call is routed on the selected trunk for routing to the TSS where the call is enhanced in accordance with the established CSCI.

Hence the SPCC concept allows different types of calls which are routed on the same trunk to get different call quality enhancements (such as True Voice® and Echo Control), depending on the call type. SPCC allows a call quality enhancement to be applied to an individual call on a per call basis. SPCC allows up to 16 different types of enhancements to be applied on a call, and these enhancements can be different at the OSS and TSS, which could give different types of enhancements to the calling party and called party. With this arrangement, new signal processing "sound flavors" (enhancements), for example, could be developed on the SPS, and these new sound flavors can be offered as a new service feature through table updates in the switching system, without software development. Moreover, SPCC allows the capability to change the current enhancement for any call type to any desired enhancement through provisioning of a CSCI Table, without new switching system development.

The SPCC concept provides an evolutionary path for current overlay networks implemented for specialized signal processing requirements, in particular the dedicated TV off network for True Voice® enhancement avoidance, and the dedicated ECoff network to avoid echo cancellation for example for SDS services. This is achieved for these services by replacing the dedicated TV off and ECoff trunks terminating on the switch with SPCC trunks having SPS per-call-control capability. The PCC capability of SPCC trunks allows the control of the TV Enhancement and the Echo Cancellation on a per call basis, thereby allowing the SPCC trunks to be used in a shared manner for calls requiring TV enhancement, calls requiring TV enhancement avoidance, and for data calls requiring no echo cancellation. The benefits are a) a very flexible per-call-control capability within a single integrated network, b) cost effectiveness, c) robustness to load surges, and d) improved network efficiency.

The above-described method advantageously provides enhancement of calls on a selected basis while also permitting non-enhanced calls to be routed between switching systems on a single, integrated network with SPCC capability, rather than requiring the use of separate networks.

DETAILED DESCRIPTION

Figure 1A:
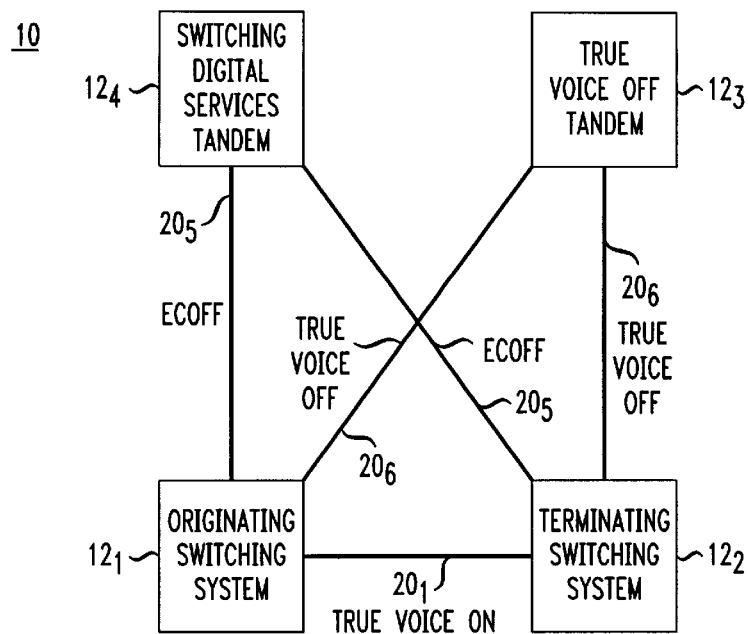
FIGS. 1a and 1b is a block schematic diagram of a telecommunications network before and after the application of the invention, respectively.

FIG. 1a illustrates the use of dedicated "overlay" networks to provide specific transmission signal processing, wherein dedicated trunking and tandem switching is implemented to provide specific transmission capabilities. Normally, voice calls are provided echo cancellation and the True Voice enhancement, wherein the associated transmission signal processing is provided on trunks denoted as TV on trunks. However, for calls not requiring the TV on signal processing, the dedicated overlay networks illustrated in FIG. 1a need to be used. For example, as shown in FIG. 1a, SDS data-type calls are routed from OSS $12_1$ to TSS $12_2$ through a partly dedicated via switching system VSS $12_5$, in which trunks $20_6$ are provisioned with EC off. Similarly, calls which need to avoid the True Voice® enhancement, such as some voice band data-type calls, are routed from OSS $12_1$ to TSS $12_2$ through a dedicated via switching system VSS $12_4$, in which trunks $20_5$ are provisioned with TV off.

Figure 1B:
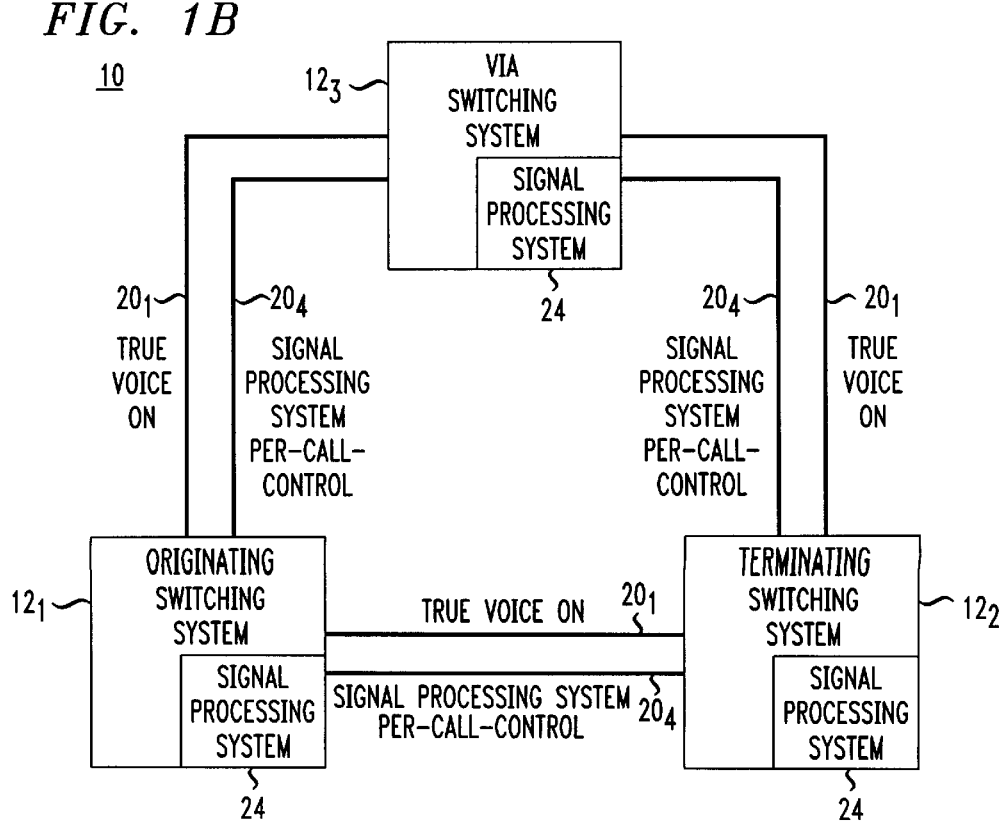

FIG. 1b illustrates the use of the signal processing system SPS 24 per-call-control network to provide transmission signal processing on a per-call demand basis in accordance with the invention. Here the SPS per-call-control trunks $20_4$ can provide TV on, TV off, and EC off on a per call basis. For example, as shown in FIG. 1b, SDS data-type calls are routed from OSS $12_1$ to TSS $12_2$ either on a direct SPCC trunk $20_4$, or through a via switching system VSS $12_3$, in which SPCC trunks $20_4$ are set to EC off. Similarly, calls which need to avoid the True Voice® enhancement, such as some voice band data-type calls, are routed from OSS $12_1$ to TSS $12_2$ either on a direct SPCC trunk $20_4$, or through a via switching system VSS $12_3$, in which SPCC trunks $20_4$ are set to TV off. Normal voice calls are provided echo cancellation and the True Voice® enhancement, and are routed from OSS $12_1$ to TSS $12_2$ either on a direct SPCC trunk $20_4$, or through a via switching system VSS $12_3$, in which SPCC trunks $20_4$ are set to TV on. If SPCC trunks are not available, these normal voice calls can be routed on trunks $20_1$ which are provisioned with TV on.

Figure 2:
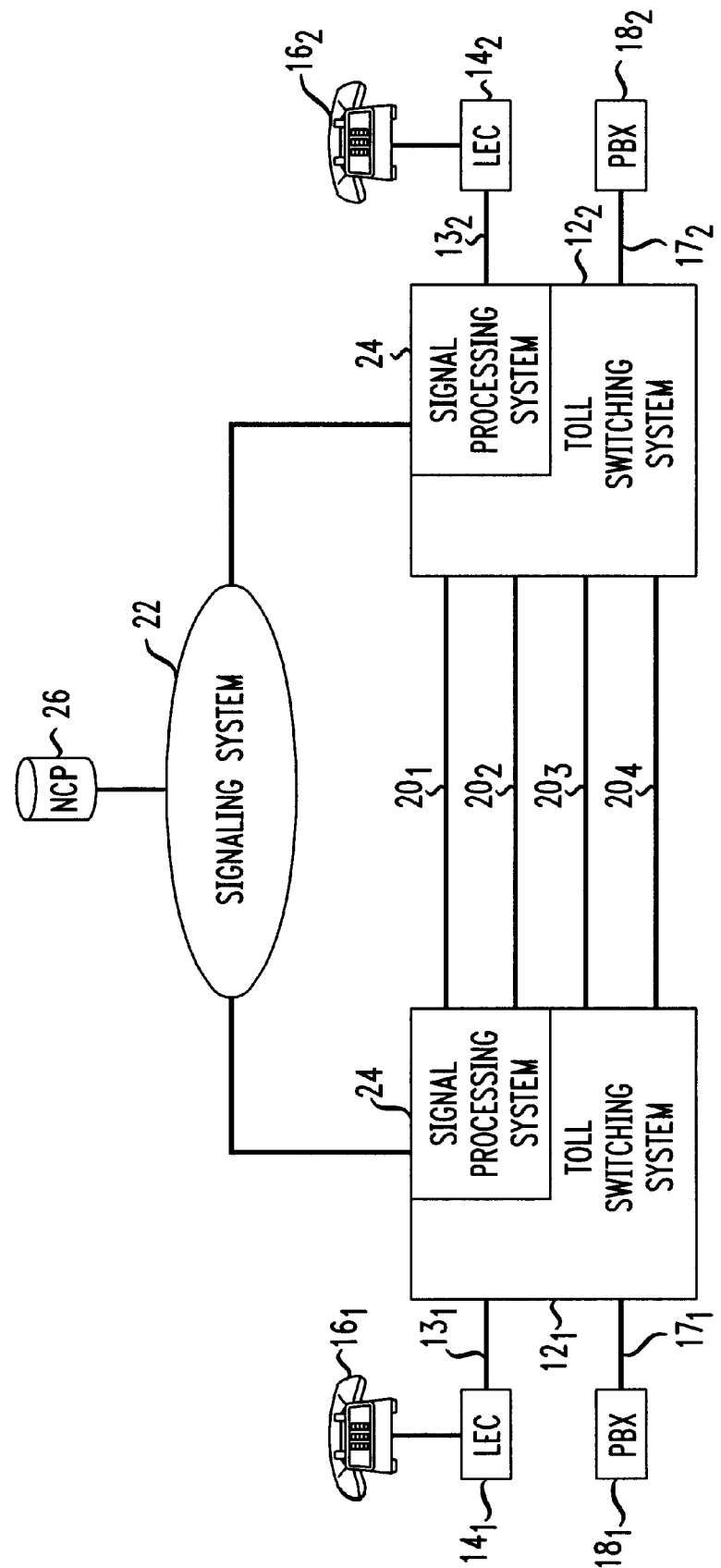
FIG. 2 is a block schematic diagram of a telecommunications network in accordance with the invention.

FIG. 2 depicts a block schematic diagram of an Inter-Exchange Carrier network 10, such as the type of network maintained by AT&T. In its simplest form, the network 10 includes a first toll switching system $12_1$, typically a model 4ESS Toll Switch, formerly manufactured by AT&T. For purposes of discussion, the switching system $12_1$ will hereinafter be referred to as an "Originating Switching System" (OSS) because calls are presumed to originate (i.e., enter the network 10) at this switching station. Such calls may be received on one of a set of trunks in a trunk group $13_1$ from a Local Exchange Carrier (LEC) central office switching system $14_1$ serving a calling party $16_1$. In practice, the LEC central office switching system $14_1$ may comprise a model 5ESS switch formerly manufactured by AT&T. Calls may also be received at the toll switching system $12_1$ on one or more trunks in a trunk group $17_1$ from a customer directly served by the switching system, such as PBX $18_1$.

Calls originating at the OSS $12_1$ terminate at a second (terminating) Toll Switching System (TSS) $12_2$ coupled to the OSS via a plurality of trunks $20_1$–$20_4$. The OSS $12_1$ is also linked to the TSS $12_2$ via a signaling system 22, such as AT&T's Common Channel Signaling System 7 as is well known in the telephony art. Calls terminating at the toll switching system $12_2$ are ultimately delivered on a trunk group $13_2$ to a LEC central office switching system $14_2$ for receipt by a called party $16_2$ or on a trunk group $17_2$ to customer directly served by the TSS, such as PBX $18_2$. While the network 10 has been depicted as including a single OSS $12_1$ and single TSS $12_2$, a typical IXC network, such as that maintained by AT&T, includes a plurality of interconnected toll switching systems, including those which originate and terminate calls, as well as via switching systems that interconnect such originating and terminating switching systems.

Both of the switching systems $12_1$ and $12_2$ possess a Signal Processing System (SPS) 24 associated with a time-slot interchanger (not shown) within each of the switching systems $12_1$, and $12_2$. The SPS 24 within each switching system may have echo cancellation capability, the ability to amplify selected frequencies as described in the Moniker et al. U.S. Pat. Nos. 5,195,132 and 5,333,195 (herein incorporated by reference) (AT&T True Voice® enhancement), and/or the ability to compensate for background noise as described in the Allen et al. U.S. Pat. Nos. 5,524,148, and 5,485,515 herein incorporated by reference. The ability of the SPS 24 to enhance voice calls is very advantageous. However, for certain types of calls, such as data calls, for example, enhancement by echo cancellation, frequency amplification and/or background noise compensation is undesirable. To avoid enhancement of certain calls that may be undesirable, the present invention provides selective enhancement on a call-by-call basis as well as routing of calls from the OSS $12_1$ to the TSS $12_2$ via one of the trunks $20_1$–$20_4$ selected in accordance with its ability to carry enhanced or non-enhanced calls as the case may be.

To provide for selective enhancement on a call-by-call basis, the OSS $12_1$, upon receipt of an incoming call, establishes a Circuit Selection Capability Indicator (CSCI) for the call. The CSCI specifies whether the call should be enhanced, and if so, what type of enhancement should be made. For certain calls, such as data calls, for example, no enhancement should be made whereas for most voice calls, echo cancellation, frequency amplification and/or background noise cancellation may be desirable. The OSS $12_1$ establishes the CSCI to activate the time slot interchanger to turn on or off the SPS 24 to provide the desired enhancement based on certain "triggers", that is, certain conditions. Generally, the triggers that dictate the CSCI for a particular incoming call are determined from one or more of the following: (1) the called number (i.e., the digits associated with the call), (2) the ANI of the calling party, (3) the nature of the trunk on which the call arrived at the OSS $12_1$, (4) call processing information relayed to the OSS $12_1$ from a Network Control Point (NCP) (i.e., a database) via the signaling system 22, and/or (5) the Service Indicator (SI) established for the call by the OSS $12_1$ based on the nature of the call class-of-service. Table I lists an exemplary set of different enhancements for various CSCI values

TABLE I

| CSCI | OSS $12_1$ | TSS $12_2$ |
|---|---|---|
| 0 | TV ON, EC ON | TV ON, EC ON |
| 1 | TV OFF, EC OFF | TV OFF, EC OFF |
| 2 | TV OFF, EC ON | TV OFF, EC ON |
| 3 | TV OFF, EC ON | TV OFF, EC ON |

Table I presumes two enhancements TV (AT&T's True Voice® Service that provides selected frequency amplification) and EC (echo cancellation). (Other types of enhancement are possible and different CSCI values will be associated therewith.) Note that two different CSCI values (2, 3) appear to be associated with the same two enhancement states. TV OFF and EC ON. In actuality, a CSCI value of 2 reflects a condition where a TV-less enhancement is required, whereas a CSCI value of 3 reflects a condition where a TV-less enhancement is desired but not required.

The nature of the enhancement dictated by the CSCI value established at the OSS $12_1$ also dictates the selection of the particular one of the trunks $20_1$–$20_4$ connecting the OSS $12_1$ and the TSS $12_2$. In the illustrated embodiment of FIG. 2 each of the trunks $20_1$–$20_4$ has different characteristics. Trunks $20_1$ and $20_2$ are designed to handle calls enhanced by the AT&T True Voice®service, as discussed above, whereas the trunks $20_3$ and $20_4$ comprise a new type of trunk, hereafter designated as an SPCC trunk, whose characteristics are set via the SPS associated with the time slot interchangers of the SPCC trunk within the OSS $12_1$ and the TSS $12_2$. Physically, the trunks $20_3$ and $20_4$ are the same as the other trunks. What differentiates the trunks $20_3$ and $20_4$ is the characteristics of the trunks, in terms of their ability to carry enhanced, non-enhanced echo controlled or non-echo controlled calls, as determined by the OSS $12_1$ and the TSS $12_2$ on an call-by-call basis, depending on the CSCI for the call in which the SPS 24 associated with the SPCC trunk is controlled accordingly.

The manner in which the trunks $20_1$–$20_4$ are selected is determined by mapping the CSCI values established in Table I to a Circuit Selection Capability (CSC) preference as shown below in Table II, denoted as the CSCI table.

TABLE II

CSCI Table

| | PCC Treatment | | FITR | CSC Preference | | | Overflow |
|---|---|---|---|---|---|---|---|
| CSC | OSS | TSS | Treatment | TV-less | SPCC | Other | CSCI |
| 0 | Default | Default | Allowed | Abs PF1 | Pres PF1 | D/C | |
| 1 | Default | Default | Prohibited | D/C | Pres PF1 | D/C | |
| 2 | TV off EC on | TV off EC on | Prohibited | Pres Req | Pres PF1 | D/C | 3 |
| 3 | TV off EC on | TV off EC on | Prohibited | Pres PF2 | Pres PF1 | D/C | |

The terms "Abs" stands for absence, "Pres" for present, "Req" for required, "PF1" 1st preferred, "PF2" for second preferred and "D/C" for don't care. The term "default" under Per-Call Control (PCC) treatment indicates that the echo cancellation and selective frequency amplification (AT&T's True Voice® service) should be on for voice calls and for SDS (data) calls. As may be appreciated from Table II, a CSCI value of 2 indicates that the selective frequency amplification should be off and the echo cancellation should be on both at the OSS $12_1$ and at the TSS $12_2$. As shown in Table II, there is a, Forced Inter-Toll Routing option whereby an intra-switching system call can receive forced inter-toll routing treatment, depending on the CSCI value.

A set of CSC preference rules are utilized by the OSS $12_1$ in selecting the particular one of trunks $20_1$–$20_4$ over which to route calls. The degree to which trunks are selected is based on the following preference order:

Required>1st Preferred (PF1)>2nd Preferred (PF2)>Don't Care (D/C)

For example, a call with a CSCI value of 2 requires a TV-less, "Presence Required" and "SPCC, Presence 1st Preferred" routing. In other words, a call having a CSCI value of 2 requires routing on a trunk for which TV-less=yes, and a first preference for the SPCC trunk (which is set using the SPS per-call control for TV off and EC on). In terms of trunk preference, the OSS $12_1$ will hunt for a trunk in the following order:

1. TV-less=yes and SPCC=yes
2. TV-less=yes and SPCC=no

If the OSS $12_1$ seizes an idle trunk and the trunk is TV controllable with SPS per-call control capability, then the SPCC is done for the call, and under such circumstances, the call will be enhanced by echo cancellation but not by selective frequency amplification (i.e., TV off). If via routing is necessary (i.e., the call must be routed from the OSS $12_1$ to the TSS $12_2$ through an intermediate or via switch, (as shown in FIG. 1b), then the VSS uses the CSCI indicator to select the trunk over which the call is routed from the VSS to TSS as first choice an SPCC trunk, and if selected the SPS function is used to turn the True Voice enhancement off on the SPCC trunk. If an SPCC trunk is not available, the VSS selects as second choice a trunk which has the True Voice enhancement provisioned off (TV off trunk), if such a trunk is available. Should such via routing fail, then the call is overflowed, whereby the CSCI value becomes 3. Once the call does reach the TSS $12_1$, the call is treated as if the CSCI were 2 and the appropriate enhancements are made.

The foregoing discloses a technique for routing calls between an Originating Switching System $12_1$ and a Terminating Switching System $12_2$, whereby calls are selectively enhanced on a call-by-call basis in accordance with a Circuit Selection Capability Indicator established by the Originating Switching System. The CSCI value is also utilized by the Originating Switching System in selecting a trunk to the Terminating switching system that is compatible with the selected type of enhancement.

It is to he understood that the above-described embodiments are merely illustrative of the principles of the invention. Various modifications and changes may be made thereto by those skilled in the art which will embody the principles of the invention and fall within the spirit and scope thereof.

What is claimed is:

1. A method of routing calls in a telecommunications network from an Originating Switching System (OSS) to a Terminating Switching System (TSS) across one of a plurality of trunks, whereby calls are selectively enhanced on a call-by-call basis, comprising the steps of:

receiving, at the OSS, an incoming call from a calling party on an incoming trunk;

establishing, at the OSS, a Circuit Selection Capability Indicator (CSCI) value indicative of a desired enhancement, if any, to be provided for the call;

selecting, in accordance with the CSCI value, one of the plurality of trunks to route the call received at the OSS to the TSS;

providing, at the OSS, the desired enhancement, if any, to the call;

providing, at the TSS, the desired enhancement of the call in accordance with the CSCI value.

2. The method according to claim 1 wherein the call is enhanced in accordance with the CSCI value by amplifying selected frequencies.

3. The method according to claim 1 wherein the call is enhanced in accordance with the CSCI value by echo cancellation.

4. The method according to claim 3 wherein the call is further enhanced in accordance with the CSCI value by amplifying selected frequencies.

5. The method according to claim 1 wherein the incoming call is a data call and wherein no enhancement is provided.

6. The method according to claim 2 wherein the trunk is selected to carry calls that have been enhanced by amplification of selected frequencies.

7. The method according to claim 3 wherein the trunk is selected to carry calls that have been enhanced by echo cancellation.

8. The method according to claim 4 wherein the trunk is selected to carry calls that are enhanced both by echo cancellation and selective frequency amplification.

9. The method according to claim 5 wherein the trunk is selected to carry calls that are not enhanced.

10. The method according to claim 1 wherein at least one of the plurality of trunks may be configured to carry enhanced and non-enhanced calls and wherein the step of selecting the trunk includes the step of configuring the trunk to carry one of said enhanced and non-enhanced trunks in accordance with the CSCI value established for the call.

11. The method according to claim 1 wherein the OSS establishes the CSCI value in accordance with the originating telephone number of the calling party.

12. The method according to claim 1 wherein the OSS establishes the CSCI value in accordance with the incoming trunk on which the call was received.

13. The method according to claim 1 wherein the OSS establishes the CSCI value in accordance with a set of dialed digits associated with the incoming call.

14. The method according to claim 1 wherein the OSS establishes the CSCI value in accordance with call processing information supplied to the OSS from a Network Control Point.

15. The method according to claim 1 wherein the OSS establishes the CSCI value in accordance Faith the Service Identity (SI) of the call.

16. A method of routing calls in a telecommunications network from an Originating Switching System (OSS) at which calls are selectively enhanced on a call-by-call basis, to a Terminating Switching System (TSS) at which calls are selectively enhanced on a call-by-call basis, across one of a plurality of trunks, at least one having the capability of carrying enhanced calls and another having a capability of carrying non-enhanced calls, comprising the steps of:

receiving, at the OSS, an incoming call from a calling party on an incoming trunk;

establishing, at the OSS, a Circuit Selection Capability Indicator (CSCI) value indicative of a desired enhancement, if any, to be provided for the call;

selecting, in accordance with the CSCI value, one of the plurality of trunks to route the call received at the OSS to the TSS so the selected trunk is compatible with the call enhancement provided by the OSS;

providing, at the OSS, the desired enhancement, if any, to the call; and providing, at the TSS, the desired enhancement of the call in accordance with the CSCI value.

17. The method according to claim 16 wherein the call is enhanced in accordance with the CSCI value by amplifying selected frequencies and wherein the trunk selected to carry calls is enhanced by amplifying selected frequencies.

18. The method according to claim 16 wherein the call is enhanced in accordance with the CSCI value by echo cancellation and wherein the trunk selected to carry calls is enhanced echo cancellation.

19. The method according to claim 16 wherein the call is enhanced in accordance with the CSCI value by amplifying selected frequencies and by echo cancellation and wherein the trunk is selected to carry calls is enhanced by amplifying selected frequencies and echo cancellation.

20. The method according to claim 16 wherein the incoming call is a data call for which no enhancement is provided and wherein the trunk selected for routing the call is compatible with non-enhanced calls.

21. The method according to claim 16 wherein at least one of the plurality of trunks may be configured to carry enhanced and non-enhanced calls and wherein the step of selecting the trunk includes the step of configuring the trunk to carry one of said enhanced and non-enhanced trunks in accordance with the CSCI value established for the call.

22. The method according to claim 16 wherein the OSS establishes the CSCI value in accordance with the originating telephone number of the calling party.

23. The method according to claim 16 wherein the OSS establishes the CSCI value in accordance with the incoming trunk on which the call was received.

24. The method according to claim 16 wherein the OSS establishes the CSCI value in accordance with a set of dialed digits associated with the incoming call.

25. The method according to claim 16 wherein the OSS establishes the CSCI value in accordance with call processing information supplied to the OSS from a Network Control Point.

26. The method according to claim 16 wherein individual signal processing characteristics are provided on a per-call basis on a selected trunk depending on an individual service type.

27. The method according to claim 26 wherein provisionable selection of transmission signal processing characteristics is accomplished on the individual service type by providing new CSCI values.

28. The method according to claim 27 wherein provisionable selection of additional transmission signal processing characteristics to add new sound enhancements is accomplished on the individual service type by providing new CSCI values.

29. The method according to claim 16 wherein signal processing per-call control capability for achieving separate signal processing characteristics is accomplished in a single integrated network that achieves capabilities of separate overlay networks on a per-call control basis.

30. The method according to claim 16 wherein the OSS and the TSS provide different enhancements.

* * * * *